Jan. 31, 1950 J. C. PLATT 2,495,761
METHOD OF SPLICING SHEET MATERIAL
Filed Oct. 19, 1944 2 Sheets-Sheet 1
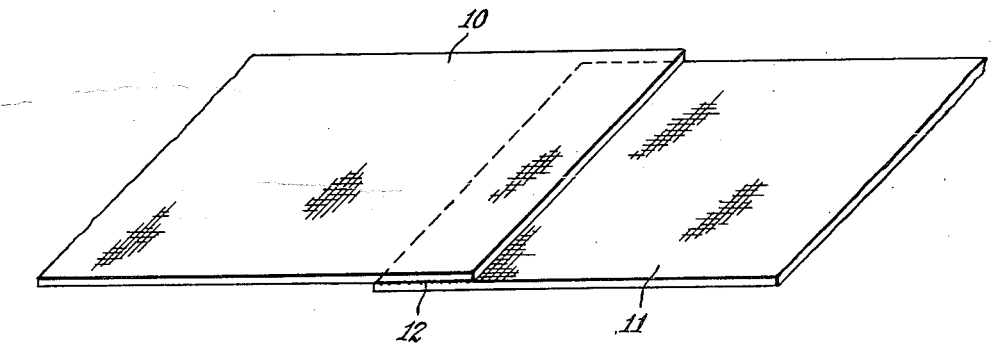
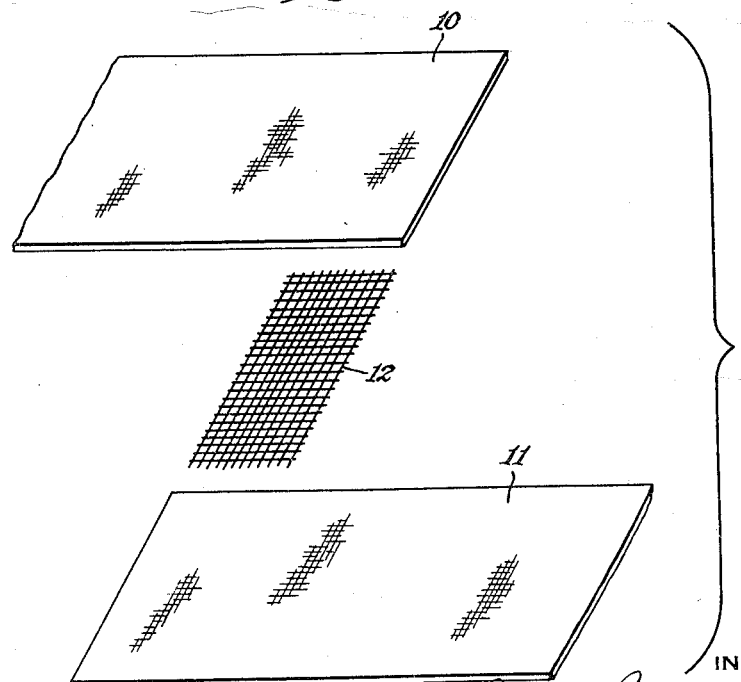

Jan. 31, 1950  J. C. PLATT  2,495,761
METHOD OF SPLICING SHEET MATERIAL
Filed Oct. 19, 1944  2 Sheets-Sheet 2
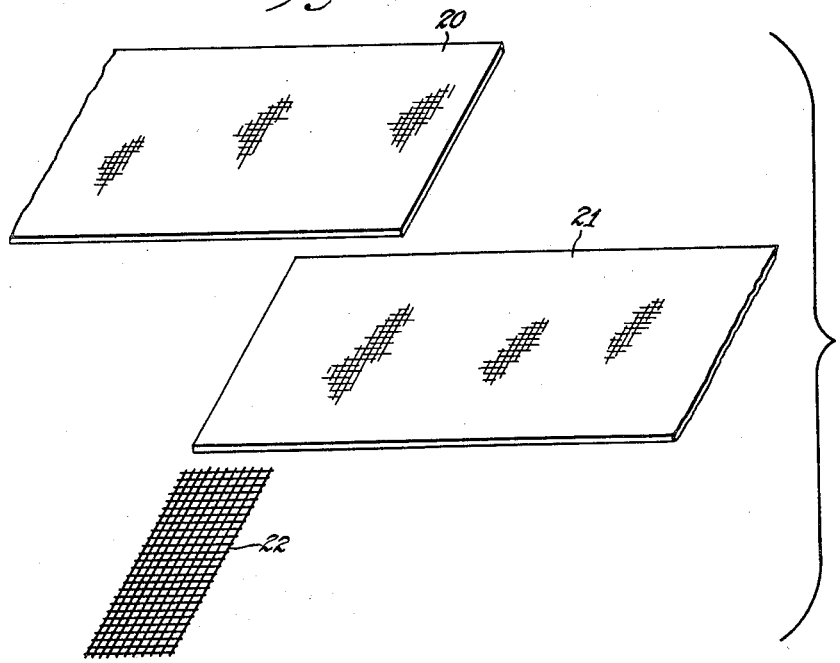
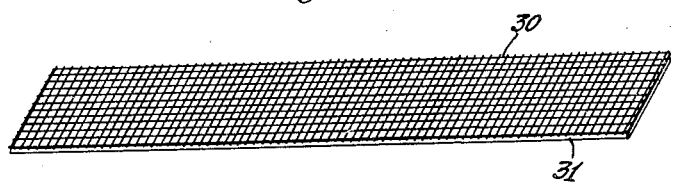
INVENTOR
James Conrad Platt
BY
Arnold W. Norfolk
ATTORNEY Patented Jan. 31, 1950

2,495,761

UNITED STATES PATENT OFFICE 2,495,761

METHOD OF SPLICING SHEET MATERIAL

James Conrad Platt, Gainesville, Ga., assignor to Chicopee Manufacturing Corporation of Georgia, a corporation of Georgia Application October 19, 1944, Serial No. 559,408

2 Claims. (Cl. 154—116)

This invention relates to a heat sensitive bonding strip and to a method of splicing sheet or web materials therewith. More particularly, it relates to a bonding strip composed of a material inherently subject to excessive dimensional changes when heat is applied and which therefore is made in the form of an open mesh screen to minimize such dimensional changes over the area of the strip. Such a material is exemplified by vinylidene chloride polymers.

While in general, the improved bonding strip may be utilized in bonding or splicing both fibrous and non-fibrous materials, for the purpose of explaining the invention, reference is made chiefly to its utility in splicing webs or sheets of fibrous material one to the other to provide continuity. In the textile or fur industry, or indeed in any industry which involves the handling of sheets or webs made up of small components or lengths, there has always existed the problem of splicing the ends of component lengths together in order that the sheet or web may be processed in the form of a continuous element. Heretofore such splices have been made by butting the ends of the lengths together and overlying the end portions of the adjacent sheets with a water sensitive or pressure sensitive tape to effect the joinder. For the most part, such splices were temporary expedients only since later processing, involving the use of moisture, heat, or the aggressive action of chemicals or solvents, materially weakens and in many cases disrupts the bond.

In accordance with the present invention, the splicing material preferably is a polymer of vinylidene chloride, more accurately described as a copolymer of vinylidene chloride and vinyl chloride. Vinylidene chloride has properties which render it particularly suitable as a bonding strip. For all practical purposes, it is substantially inert. It is not affected by water, aliphatic solvents, aromatic solvents, oils, varnishes, ketones, acids, alkalis, or living micro-organisms. Vinylidene chloride has tremendous tensile and bonding strength, good flexibility, high resistance to fatigue and abrasion, non-flammability, high dielectric strength, and ease of cutting. Furthermore, it retains these properties under all conditions of temperature usually encountered in commercial applications. It is unaffected by cold down to temperatures as low as −15° F. and by heat up to temperatures of at least 350° F.

To make a splice, i. e., to connect two sheets of material together end to end, the sheets, at their ends, are placed in overlapping relation with a strip of vinylidene chloride interposed between the overlapping portions. Heat is then applied as by means of an iron to one or both sides of the overlapping portions. The temperature used must be such as to cause the vinylidene chloride to soften and sink into the interstices of the sheet. Upon cooling, a firm bond is established which has all of the properties heretofore attributed to vinylidene chloride. A somewhat similar splice may be made by overlapping the ends of the sheets and placing the strip of vinylidene chloride in contact with the outer face of one of the overlapping portions. With a slice of this character it is preferred that the heat be applied at the opposite face of the sheet since the vinylidene chloride, when soft, will seep through both layers of sheet material to effect the bond. This type of splice is preferred where the sheets are extremely porous or have a relatively open mesh structure.

The improved bonding strip may be used with all types of fibrous materials such as paper, cloth, synthetic fabrics, and woven glass, to mention a few. It may also be used for splicing or laminating non-fibrous materials such as metal foil, plastic film or equivalent materials.

According to the present invention, the heat sensitive bonding strip is a filamentary structure woven or knitted sufficiently loose to permit the individual filaments to move relatively to each other. Where a substance is subject to excessive dimensional changes upon the application of heat, as is the case with vinylidene chloride, it has been discovered that a filamentary structure of the character contemplated, when subject to such conditions, will undergo a far less overall dimensional change for a given area than will a continuous film of the same size. As to this feature, the invention is not confined to vinylidene chloride since a like structure will be equally effective with other material subject to similar dimensional changes.

A better understanding of the invention may be had by reference to the following drawings wherein Fig. 1 is a perspective view of a splice using a bonding strip made in accordance with the invention, Fig. 2 is an exploded view in perspective illustrating the manner in which the sheet material and the heat sensitive bonding strip are assembled prior to the heat sealing operation, Fig. 3 is an exploded view in perspective, illustrating a different manner in which the sheet material and heat sensitive bonding strip may be assembled prior to the heat sealing operation.

Fig. 4 is a perspective view of a bonding strip temporarily laminated to a backing to prevent fraying prior to use.

In accordance with the invention, a splice is made by overlapping the end portions of two sheets 10 and 11 of web material and interposing between the sheets and throughout the overlap area, a bonding strip 12 preferably of vinylidene chloride (Figs. 1 and 2). The degree of overlap will depend upon the character of the bonding strip and the strength required in the splice. As previously stated, the bonding strip 12 is woven or knitted with sufficient looseness to permit the individual filaments or threads to move relatively to each other. For example, a weave similar to that used for mosquito netting, i. e., a plain weave having from 8 to 24 ends per inch in both directions will suffice. The character of the weave in part determines the tensile strength over the splice since the tighter the weave the greater is the strength in shear of the bond which acts to resist longitudinal forces acting upon the web. The strength in the bond shear is also dependent upon the width of the strip employed—in other words, the degree of overlap between the sheets, assuming the overall area of the bonding strip is commensurate with the overlap.

After the sheets 10 and 11 and the bonding strip 12 are properly located, heat is applied at one or both sides, to soften the heat sensitive plastic, permitting it to flow into the interstices of the sheet material. Upon cooling, the improved bond results. Cooling is practically instantaneous so that relatively little time is needed to complete the splicing operation. Where the bonding strip is vinylidene chloride, the bonding temperature required is usually between 300° and 400° F.

As previously stated, the bonding strip preferably has an open weave or knit to minimize the shrinkage which occurs in such materials as vinylidene chloride when heat is applied. If a film material is used, shrinkage takes place in all directions. With an open mesh knitted or woven material, on the other hand, shrinkage in the individual threads has no effect upon neighboring threads because of the relative movement that may take place. Thus, the total shrinkage over a given area of screen will be substantially less than over an equivalent area of film. So slight is the shrinkage in the open mesh material that highly satisfactory bonds result in most cases. However, if the splices are long, as will be the case in exceptionally wide webs, compensation for shrinkage may be made by using a bonding strip longer than the length of the splice.

In the embodiment of the invention illustrated in Fig. 3, a splice is made by overlapping two webs of sheet material 20 and 21 at their ends for a distance depending upon the strength of the splice desired, and locating a strip of bonding material 22, preferably vinylidene chloride, equivalent in area to the overlap portion adjacent one of the sheets at the outside. Heat is then applied to the composite from the side opposite the heat bonding element 22 to effect the bonding action. This method is preferred where the sheet material to be spliced is of a relatively open weave such as is employed in the manufacture of gauze.

The bonding strip may be merchandised either in the form of rolls or sheets. To prevent fraying at the edges, it may be preferred to supply the product with a backing of some suitable material. Such a sheet is shown in Fig. 4 wherein a heat bonding strip 30 is suitably anchored to a backing material 31 either by a pressure-sensitive, thermo-sensitive, or solvent-sensitive adhesive. The backing may be removed before the heat bonding strip is placed in service although removal of the backing strip may be unnecessary in some applications.

The improved product and method have many practical advantages. The bond in most instances is as strong as the material spliced. This is true even in the case of woven glass. It permits continuous operation of machines which process continuous webs, enabling manufacturers to sell web material in standard lengths. Furthermore, it will stand up under substantially all subsequent processing to which such webs are subjected.

The invention has been described in its preferred form and many modifications thereof are included within its spirit. It is to be limited, therefore, only by the prior art and the scope of the appended claims.

What I claim is:

1. The method of splicing a plurality of layers of sheet material which comprises making a composite by superimposing said layers with a layer of bonding material having an open mesh structure formed of normally solid heat sensitizable adhesive polyvinylidene chloride filaments which are relatively movable to permit their individual dimensional adjustment, without any substantial positional adjustment, upon the application of bonding temperatures, and applying heat to the composite to effect the bonding operation.

2. The method of splicing a plurality of layers of sheet material having free ends which comprise making a composite by superimposing said layers near their ends with a layer of bonding material having an open mesh structure formed of normally solid heat sensitizable adhesive polyvinylidene chloride filaments which are integral, self-contained, and relatively movable to permit their individual dimentional adjustment upon the application of bonding temperatures, and applying heat to the composite to effect the bonding operation, while said individual dimensional adjustment of said filaments is effected, and in absence of any substantial positional adjustment.

JAMES CONRAD PLATT.

REFERENCES CITED

The following references are of record in the file of this patent:

UNITED STATES PATENTS

| Number | Name | Date |
| --- | --- | --- |
| 1,903,960 | Dreyfus | Apr. 18, 1933 |
| 1,970,257 | Tetlow | Aug. 14, 1934 |
| 2,281,635 | Strauss | May 5, 1942 |
| 2,283,698 | Redman | May 19, 1942 |
| 2,335,159 | Salfisberg | Nov. 23, 1943 |
| 2,364,903 | Howard | Dec. 12, 1944 |
| 2,384,462 | Goodman | Sept. 11, 1945 |